UNITED STATES PATENT OFFICE.

JAMES F. WEST, FRANK S. MASTERS, AND WILLIAM E. LOTT, OF BROOKVILLE, INDIANA.

COMPOUND FOR FILLING VEHICLE-TIRES.

No. 909,376.　　　Specification of Letters Patent.　　　Patented Jan. 19, 1909.

Application filed March 9, 1908. Serial No. 419,984.

*To all whom it may concern:*

Be it known that we, JAMES F. WEST, FRANK S. MASTERS, and WILLIAM E. LOTT, citizens of the United States, residing at Brookville, in the county of Franklin and State of Indiana, have invented certain new and useful Improvements in Compounds for Filling Vehicle-Tires, of which the following is a specification.

Our invention relates to compounds for filling vehicle-tires, and it has for its object the production of a compound which can be used in the filling of the tires of vehicles of all classes, but especially those of automobiles and bicycles, and by which tires so filled may be substituted for those filled with air under pressure and known as pneumatic tires and which are objectionable owing to their liability to puncture, as well as to bursting under the pressure with which the air is confined therein.

To this end we have produced a compound or filling for vehicle-tires which is unaffected by extremes of temperature, and which will not harden or become soft but remains of the jelly-like consistency necessary to cause it to render efficient service. It is of such consistency that the puncturing of the tire tube filled therewith by the points of sharp objects, such as nails, tacks or glass, will not affect the running qualities of such tire.

Our filling compound forms a mass sufficiently elastic to yield under pressure and to take up the jar or shock due to the striking and running over stones or other inequalities in the road, but will at the same time, be free from the bounding or jarring common to cushion and other tires not possessing the required degree of elasticity, and thus will not only lengthen the life of the tires but also that of the vehicle by relieving it of the stress and strain incident to such jarring.

With these and other objects in view our tire filling compound which we employ is made from the following enumerated ingredients which, when assembled together in the manner and appropriate proportions given we have found will produce a compound possessing the properties desired, same being as follows: glue, gelatin, glycerin, kaolin, formaldehyde, and water. In producing a given quantity the proportions are: glue four ounces; gelatin two ounces, glycerin four ounces, kaolin two ounces, and water six ounces. The glue is dissolved in the water and the gelatin in the glycerin and the two latter ingredients added to the first two; the kaolin is then added, and the whole is heated and thoroughly stirred and mixed until all lumps are dissolved. The stated quantity of formaldehyde is then added.

The liquid compound thus prepared is applied to the interior of the tire tube by pumping the same therein while in a heated condition, and when it has become cold therein the tire is in condition for use.

What we claim is:

An elastic filling compound for vehicle-tires comprising glue, gelatin, glycerin, kaolin, water, and formaldehyde in substantially the proportions set forth.

In testimony whereof we affix our signatures in presence of two witnesses.

JAMES F. WEST.
　　　　FRANK S. MASTERS.
　　　　WILLIAM E. LOTT.

Witnesses:
　JACOB SOTTONG,
　CHAS. H. BLACKLIDGE.